US008161046B2

(12) United States Patent
Hadjieleftheriou et al.

(10) Patent No.: US 8,161,046 B2
(45) Date of Patent: Apr. 17, 2012

(54) SELECTIVITY ESTIMATION OF SET SIMILARITY SELECTION QUERIES

(75) Inventors: Marios Hadjieleftheriou, Madison, NJ (US); Nick Koudas, Toronto (CA); Divesh Srivastava, Summit, NJ (US); Xiaohui Yu, Maple (CA)

(73) Assignee: AT&T Intellectual Property I, L.P., Atlanta, GA (US)

( * ) Notice: Subject to any disclaimer, the term of this patent is extended or adjusted under 35 U.S.C. 154(b) by 714 days.

(21) Appl. No.: 12/274,546

(22) Filed: Nov. 20, 2008

(65) Prior Publication Data
US 2010/0125559 A1      May 20, 2010

(51) Int. Cl.
G06F 17/30           (2006.01)
G06F 7/00            (2006.01)
(52) U.S. Cl. ....................................... 707/736
(58) Field of Classification Search .................. 707/736, 707/999.003
See application file for complete search history.

(56) References Cited

U.S. PATENT DOCUMENTS

| 2008/0313128 | A1* | 12/2008 | Arasu et al. | 707/2 |
| 2010/0121817 | A1* | 5/2010 | Meyer et al. | 707/623 |
| 2010/0121839 | A1* | 5/2010 | Meyer et al. | 707/720 |
| 2010/0125594 | A1* | 5/2010 | Li et al. | 707/758 |

OTHER PUBLICATIONS

Olken, F. "Random Sampling from Databases", Ph.D. Dissertation, Department of Computer Science, University of California at Berkeley, 1993.*
Mamoulis, N. "Efficient Processing of Joins on Set-Valued Attributes", Proceedings of the SIGMOD Conference, pp. 157-168, 2003.*
Chaudhuri, S., K. Ganjam, V. Ganti and R. Motwani "Robust and Efficient Fuzzy Match for Online Data Cleaning", Proceedings of the SIGMOD Conference, Jun. 9-12, 2003.*
Fagin, R., A. Lotem and M. Naor "Optimal Aggregation Algorithms for Middleware", Journal of Computer and System Sciences, vol. 66, pp. 614-656, 2003.*
Sarawagi, S. and Al. Kirpal "Efficient Set Joins on Similarity Predicates", Proceedings of the SIGMOD Conference, Jun. 13-18, 2004.*
Jin, L., C. Li, N. Koudas and A.K.H. Tung "Indexing Mixed Types for Approximate Retrieval", Proceedings of the 31st Very Large Database Conference (VLDB), pp. 793-804, 2005.*
Jin, L. and C. Li "Selectivity Estimation for Fuzzy String Predicates in Large Data Sets", Proceedings of the 31st Very Large Database Conference (VLDB), pp. 397-408, 2005.*
Guha, s., N. Koudas, D. Srivastava and X. Yu "Reasoning about Approximate Match Query Results", Proceedings of the International Conference on Data Engineering (ICDE), pp. 8-18, 2006.*
Arasu, A., V. Ganti and R. Kaushik "Efficient Exact Set-Similarity Joins", Proceedings of the Very Large Database Conference (VLDB), Sep. 12-15, 2006.*
Tata, S. and J.M. Patel "Estimating the Selectivity of tf-idf-Based Cosine Similarity Predicates", SIGMOD Record, vol. 36, No. 2, pp. 7-12, Jun. 2007.*
Lee, H., R.T. Ng and K. Shim "Extending Q-Grams to Estimate Selectivity of String Matching with Low Edit Distance", Proceedings of the 33rd Very Large Database Conference (VLDB), pp. 195-206, Sep. 23-28, 2007.*

(Continued)

Primary Examiner — Kimberly Lovel (57) ABSTRACT

The invention relates to a system and/or methodology for selectivity estimation of set similarity queries. More specifically, the invention relates to a selectivity estimation technique employing hashed sampling. The invention providing for samples constructed a priori that can efficiently and quickly provide accurate estimates for arbitrary queries, and can be updated efficiently as well.

31 Claims, 7 Drawing Sheets

OTHER PUBLICATIONS

Hadjieleftheriou, M., A. Chandel, N. Koudas and D. Srivastava "Fast Indexes and Algorithms for Set Similarity Selection Queries", Proceedings of the 24th International Conference on Data Engineering (ICDE), pp. 267-276, Apr. 7-12, 2008.*

Hadjieleftheriou, M., X. Yu, N. Koudas and D. Srivastava "Hashed Samples: Selectivity Estimators for Set Similarity Selection Queries", Proceedings of the Very Large Database Conference (VLDB), pp. 201-212, Aug. 24-30, 2008.*

Hadjieleftheriou, M. and D. Srivastava "Weighted Set-Based String Similarity", Bulletin of the Technical Committee on Data Engineering, vol. 33, No. 1, pp. 25-36, Mar. 2010.*

* cited by examiner

SELECTIVITY ESTIMATION OF SET SIMILARITY SELECTION QUERIES

BACKGROUND

The growth of database and query technology has made data collection and storage more useful, affordable, and convenient than ever before. Many of the computer systems used around the world on a daily basis rely at least in some part on databases, and efficient access to the information contained in those databases. However, data collections often contain inconsistencies that arise as the result of a plethora of reasons, such as typographical errors, inconsistent formatting conventions, data transformation errors, and so forth.

Consistent or clean data is of high monetary significance for business applications, and is generally desirable for efficient and effective handling of data collections. The utility of a data collection is largely dependent on the ability to accurately retrieve desired information or data. A plurality of string similarity operators have been proposed to overcome the inconsistencies in data collections, balancing various performance features such as computing power cost, accuracy, and/or the ability to update the database.

Although, no methods have been proposed so far that enable accurate selectivity estimation of these string similarity operators. It would be desirable to design selectivity estimation techniques that provides accurate estimates very fast, for arbitrary queries, and can be updated very efficiently. Selectivity estimation is useful for query optimization purposes and more.

SUMMARY

The following presents a simplified summary of the disclosure in order to provide a basic understanding of some aspects of the full written description. This summary is not an extensive overview of the disclosure. It is not intended to identify key/critical elements of the invention or to delineate the scope of the invention. Its sole purpose is to present some concepts of the invention in a simplified form as a prelude to the more detailed description that is presented later.

In one embodiment, a selectivity estimation system is disclosed, including a user interface component that obtains at least one search query, and a query component that estimates the number of data incidents in a data store that resemble the search query, based at least in part on a pre-specified similarity function, and criteria defined by the search query.

In another embodiment, a method for selectivity estimation is disclosed, including the steps of acquiring at least one search query, and estimating the number of data incidents in a data store that resemble the search query, based at least in part on a pre-specified similarity function, and criteria defined by the search query.

In yet another embodiment, a selectivity estimation system is disclosed, wherein the system includes means for acquiring at least one search query, means for estimating the number of data incidents in a data store that resemble the search query, based at least in part on a pre-specified similarity function, and criteria defined by the search query, and means for generating an inverted index consisting of a plurality of inverted lists, by decomposing each data incident in the data store into at least one set, the sets being comprised of at least one token, and generating at least one list per token, wherein a token list contain a partial weight contribution and a set id for each data incident in the data store that contains this token.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident; however, that such matter can be practiced without these specific details. In other instances, well-known structures and devices are shown in block diagram form in order to facilitate describing the claimed subject matter.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
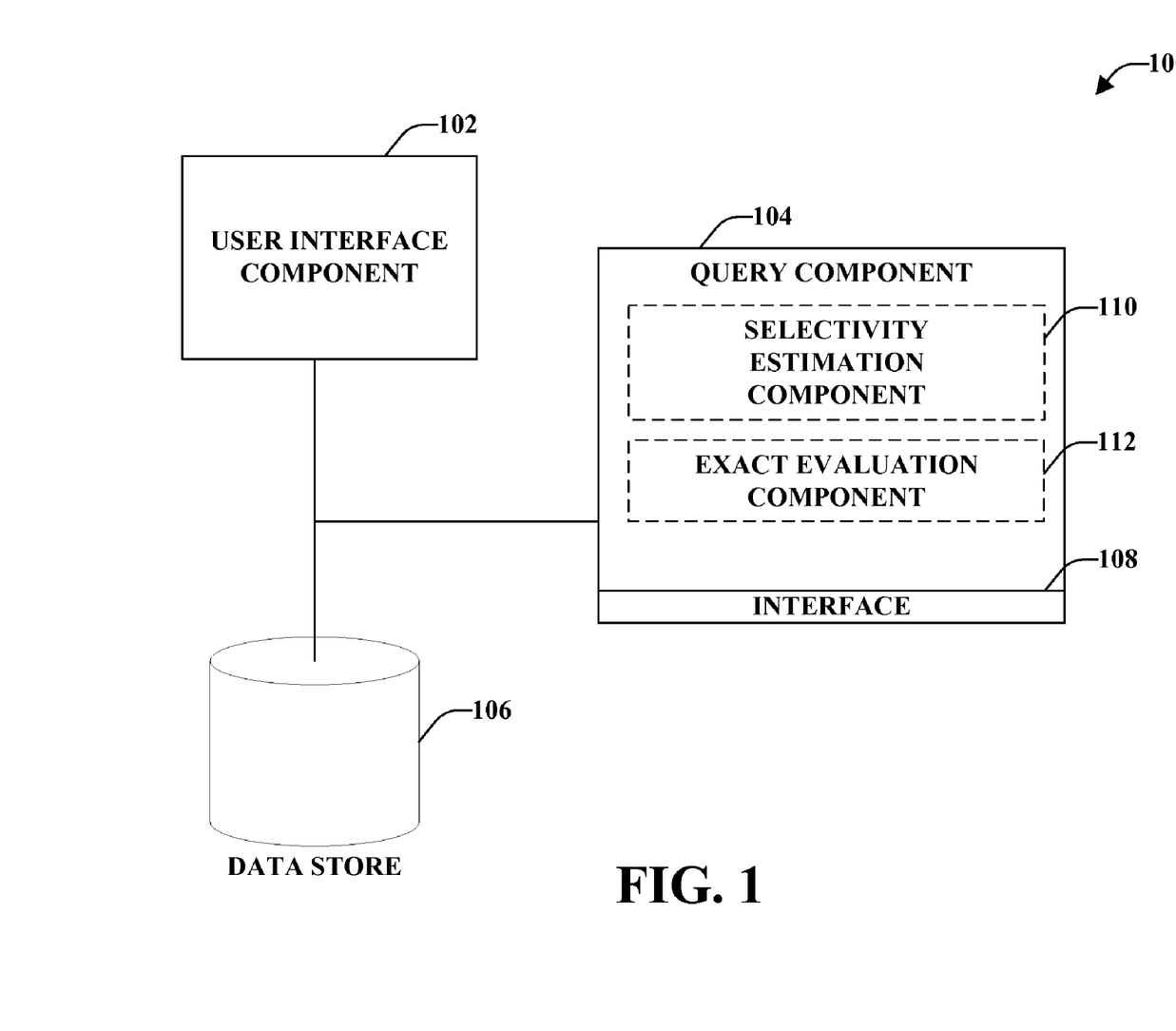
FIG. 1 is a general component block diagram illustrating a system for estimating selectivity for database indexing and querying in accordance with an aspect of the present invention.

Referring initially to the drawings, FIG. 1 illustrates an example system 100 that can estimate selectivity for database indexing and querying. The system 100 includes a user interface component 102, a query component 104, and a data store 106. The user interface component 102 (hereinafter "user interface") enables users to input a search query. The inputs can include explicit user inputs (e.g., configuration selections, question/answer) such as from touch screen selections, keyboard, mouse, speech, scanner and so forth. The user interface 102 may be a form on a web site wherein users access the form via a web browser on a personal computer, mobile device, and so forth. It is also to be appreciated that the user interface 102 may be a standalone application, applet or widget executing on a personal computer or mobile device. For example, users may input the search query via an applet on a cellular telephone. The applet communicates the search query to the query component 104 via a network (e.g. wireless network, local area network, the Internet, etc.).

The search query can include a variety of criteria supplied by the user. For example, the criteria can contain one or more strings. The search query is provided to query component 104 to locate data incidents in accordance with the criteria included in the search query. The query component 104 may translate the user input into a format suitable for searching the data store 106 (e.g. database, database management system etc.). The particular format utilized is dependent on the type of database and/or data model employed by the system 100. For example, if the data store 106 is a relational database, the query component 104 may translate the search query into Structured Query Language (SQL). If the data store 106 employs a markup data model like XML, the query component 104 may utilize an XQuery or XPath format. Alternatively, if search query is already in a suitable format, the query component 104 can simply pass such data through to the data store 106. Furthermore, the query component 104 includes an interface component 108 that includes any suitable and/or necessary adapters, connectors, channels, communication paths, etc. to integrate the query component 104 into virtually any operating and/or database system(s). Moreover, the interface component 108 can provide various adapters, connectors, channels, communication paths, etc., that provide for interaction with the query component 104.

The query component 104 is communicatively coupled to the data store 106. The query component 104 communicates the translated search query to the data store 106, which employs the translated search query to search for data matching the search criteria. Matching data events are retrieved and returned to the users via the user interface 102 for review. The matching data events may be presented to the users as a list of events with details of the events provided therewith. For example, each event in the list may include a title and/or a description of the data event. The data events may be links that enable the users to access the data events.

In addition, the query component 104 includes a selectivity estimation component 110 and an exact evaluation component 112. The selectivity estimation component 110 distinguishes similarities between the search query and the data incidents maintained in the data store 106, such as minor typographical errors, synonyms, and so forth. The selectivity estimation component 110 can estimate how many data incidents that are similar to the query will be retrieved from the data store 106 based on a plurality of similarity measures.

For example, the similarity between two strings can be computed as follows. Let two strings that have been decomposed into sets of words: q="Main St., Main", s="Main St., Maine." The strings can be mapped into token multi-sets, such as q={'Main', 'St.', 'Main'} and s={'Main', 'St.', 'Maine'}. The two multi-sets share two tokens in common. Greater similarity of the multi-sets indicates larger potential similarity of the strings q and s. Tokens that appear frequently in the data store 106 (e.g. 'Main' or 'St.') contain only modest information content, whereas rare tokens (e.g. 'Maine') are more important semantically. Token weights can be assigned based on importance in determining similarity. For instance, weighted similarity measures that use the inverse document frequency (IDF) as token weights can be used. The IDF of a token is the inverse of the total number of times that the token appears in the data store 106 (e.g. data collection). Additionally, weighted measures can assign token weight based on term frequency (TF), wherein each token is weighted in accordance with the total number of times the token appears in the multi-set. It is to be appreciated that additional or alternative token weight measures can be employed within the scope of this invention.

The TF/IDF similarity of a pair of strings can be defined as follows. Without loss of generality, let D be a collection of strings where each string has been decomposed into words, q-grams, and so forth. Every set consists of a number of elements from a universe U. Assume a set $s=\{t_1 \ldots t_n\}$, $t_i \in U$. The IDF weight of a token ($t_i$) can be calculated using the equation:

$$idf(t_i) = \log 2(1 + N/N(t_i)) \quad \text{Equation (1)}$$

where $N(t_i)$ is the total number of sets containing the token $t_i$ and N is the total number of sets in D. The normalized length of the set s can be computed using the following equation:

$$len(s) = \sqrt{\sum_{t_i \in s} [tf(t_i, s)^2 * idf(\Box t_i)^2]} \quad \text{Equation (2)}$$

where $tf(t_i, s)$ is the term frequency of the token $t_i$ in the set s. In addition, the length normalized TF/IDF similarity of two sets q (e.g. a query) and s can be determined using the equation:

$$I(q, s) \sum_{t_i \in q \cap s} \frac{tf(t_i, s) \cdot tf(t_i, q) \cdot idf(t_i)^2}{len(s) \cdot len(q)} \quad \text{Equation (3)}$$

wherein I(q, s) is a similarity measure, $tf(t_i, q)$ is the term frequency of the token $t_i$ in the query set q, and len(q) is the normalized length of set q. Length normalization restricts the similarity measurement in the interval [0, 1]. If q=s, the TF/IDF score is equal to 1. Otherwise, the TF/IDF score increases in the interval from zero to one as the number of common tokens increases. Additionally, the contribution of each token to the similarity is dampened as the difference in the normalized length of the two sets grows.

The selectivity estimation component 110 is based on an indexing component for exact evaluation of set similarity queries. The exact evaluation of similarity queries can be accomplished using an inverted index. More specifically, let the partial weight contribution $w(t_i, s)$ of token $t_i \in s$, to I(q, s), for arbitrary q, be:

$$w(t_i, s) = \frac{tf(t_i, s) \cdot idf(t_i)}{len(s)} \quad \text{Equation (4)}$$

The exact evaluation component 112 can construct one inverted list per token $t_i \in s$, that consists of one pair $\{s, w(t_i, s)\}$ per set s containing $t_i$. The inverted list corresponding to token $t_i$ is denoted with $\vec{t}_i$. If the lists are sorted in increasing or decreasing order of set ids s, the exact evaluation component 112 can scan the inverted list $\vec{t}_1, \ldots, \vec{t}_n$ and compute I(q, s) for all s in one pass using a merge sort algorithm, and report the sets exceeding a threshold τ. It can be appreciated that the exact evaluation component 112 never accesses irrelevant sets (i.e., with s∩ q=∅).

TABLE 1

| id | W | | $t_1$ | | $t_2$ | | $t_3$ |
|---|---|---|---|---|---|---|---|
| | | 1 | 0.7 | 2 | 0.4 | 3 | 0.1 |
| | | 2 | 0.5 | 3 | 0.4 | 4 | 0.1 |
| | | 4 | 0.5 | 4 | 0.4 | 7 | 0.1 |
| | | 5 | 0.1 | 6 | 0.1 | ... | |
| | | ... | | ... | | 8 | 0.1 |
| | | | | | | ... | |

Alternatively or additionally, if the lists are sorted in decreasing order of partial weights w($t_i$, s), given that TF/IDF is a monotonic score function, the exact evaluation component 112 can use TA/NRA style algorithms to compute the scores incrementally, and potentially terminate prior to exhaustively reading the lists.

Figure 2:
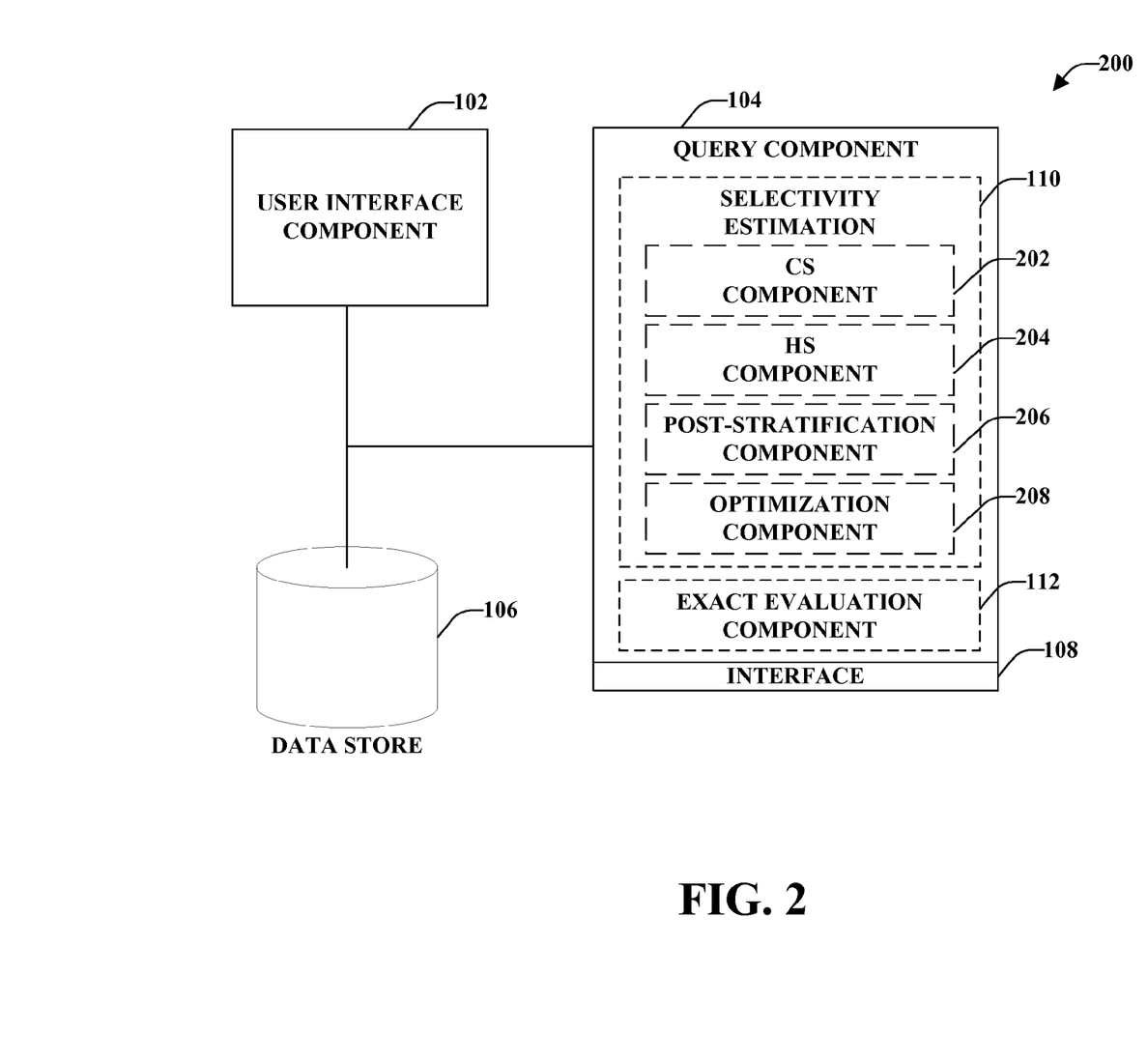
FIG. 2 is a general component block diagram illustrating a system for estimating selectivity for database indexing and querying using hashed samples in accordance with an aspect of the present invention.

Referring now to FIG. 2, an exemplary system 200 that can estimate selectivity for database indexing and querying, based on the inverted lists of the exact evaluation component 112, using hashed samples is illustrated. The system 200 includes the user interface component 102, the query component 104, and the data store 106. As previously discussed, the user interface component 102 is communicatively coupled to the query component 104, and enables users to input a search query. For simplicity of explanation, it is assumed that the search query is comprised of one or more strings. The search query is obtained by the query component 104 and communicated to the data store 106, which employs the translated search query to estimate the number of data incidents contained in the data store that match the search criteria. The estimated number is returned to the users via the user interface 102.

The query component 104 includes a selectivity estimation component 110 having a sample construction component 202 (hereinafter "CS component"), and a hashed sample component 204 (hereinafter "HS component"). As noted supra, the selectivity estimation component 110 can identify possible variations of the search query that may be maintained in the data store 106, such as typographical errors, synonyms, and so forth, based on a given similarity function (e.g. TF/IDF). The selectivity estimation component 110 can identify related data incidents contained in the data store 106 based on such variations, and estimate how many such incidents will be retrieved from the data store 106 for the given search query.

The CS component 202 constructs one uniform random sample for every inverted list present in the exact evaluation component 112, the CS component 202 effectuates a random permutation on the domain of set ids D (previously discussed), and selects a consistent subset of the permuted ids from every inverted list of the exact evaluation component 112 (see Table 1). This can be accomplished by utilizing a universal hash function h, such that h: D→P. The values of h($s_1$), ..., h($s_{|D|}$) will appear to be a sequence of independent and identically distributed (i.i.d.) samples from the discrete uniform distribution over D. The hash function, in an empirical sense, imposes a random permutation of the elements in D.

One or more random samples can be generated such that they satisfy a predetermined user and/or system requirement of a space budget S. The space budget is the amount of space available for use by the selectivity estimation component 110.

The CS component 202 randomly selects a universal hash function h from a family of hash functions H. For simplicity of explanation, assume the hash function h distributes values in the interval [1, 100]. The CS component samples from every list $\vec{t}_i$, all set ids s with a hash value h(s)≤x, wherein x is a threshold value. Given that the hash function h is distributing ids uniformly across the interval [1,100], the CS component 202 will approximately produce an x % sample of list $\vec{t}_i$, and an x % overall sample of the inverted lists contained in the exact evaluation component 112. The CS component 202 can determine the maximum threshold value x based on the total size of the inverted lists contained in the exact evaluation component 112, and the space budget S. The sampled inverted list of token $t_i$ is denote by $\vec{t}_i$.

Table 2 below illustrates an exemplary random permutation using hash function h. The top portion of Table 2 illustrates the original universe $\vec{t}_1 \cup \ldots \cup \vec{t}_n$. The bottom portion illustrates a random permutation using the hash function h, wherein any prefix of set ids in the permutation is equivalent to a uniform random sample from the universe $\vec{t}_1 \cup \ldots \cup \vec{t}_n$.

TABLE 2

| | 1 | 2 | 3 | 4 | 5 | | m |
|---|---|---|---|---|---|---|---|
| | $s_1$ | $s_2$ | $s_3$ | $s_4$ | $s_5$ | | $s_m$ |
| $t_1$ | 1 | 1 | 1 | 0 | 0 | ... | 0 | 1 |
| $t_2$ | 0 | 1 | 1 | 1 | 0 | ... | 0 | 0 |
| ⋮ | | | ⋮ | | | | ⋮ | |
| ⋮ | | | ⋮ | | | | ⋮ | |
| $t_n$ | 1 | 0 | 0 | 0 | 1 | ... | 1 | 0 | h($s_4$) = 1, h($s_m$) = 2, ...

| | $s_4$ | $s_m$ | $s_1$ | $s_2$ | $s_9$ | | $s_3$ |
|---|---|---|---|---|---|---|---|
| $t_1$ | 0 | 1 | 1 | 1 | 1 | ... | 0 | 1 |
| $t_2$ | 1 | 0 | 0 | 1 | 1 | ... | 1 | 1 |
| ⋮ | | | ⋮ | | | | ⋮ | |
| ⋮ | | | ⋮ | | | | ⋮ | |
| $t_n$ | 0 | 0 | 1 | 0 | 1 | ... | 1 | 0 |

The HS component 204 is communicatively coupled to the CS component 202, and determines the similarity score (e.g., TF/IDF) of all sampled sets with the query, the size of the sample union of an arbitrary combination of sampled inverted lists $\tilde{t}_1$, and the distinct number of set ids contained in the union of an arbitrary combination of inverted lists $\vec{t}_i$. The HS component 204 estimates the selectivity of the query q= {$t_1, \ldots, t_n$} by constructing the sample union $\tilde{q}_\cup = \tilde{t}_1 \cup \ldots \cup \tilde{t}_n$, and estimating from the sample using the equation:

$$A = |A_{\tilde{q}_\cup}| \cdot \frac{|q_\cup|d}{|\tilde{q}_\cup|d} \quad \text{Equation (5)}$$

wherein A is the selectivity estimation. The construction of the sampled lists ensures that for every sampled id s∈$\tilde{q}_\cup$ all partial weights w($t_i$, s) in lists $\vec{t}_1, \ldots, \vec{t}_n$ are present in $\tilde{q}_\cup$, and thus the scores I(q, s) can be determined directly from the sample. Hence, the total number of sets contained in the sample with similarity score larger than τ, can be computed from the sample directly. In addition, quantity $|\tilde{q}_U|_d$ (the denominator in Equation 5) is easily computed by a linear scan of the sample union. The HS component 204 also estimates the distinct number of set ids $|q_U|_d$ (the nominator in Equation 5) required for scaling up the sample result. The HS component 204 employs the list samples (previously discussed) to estimate the distinct number of ids in the union of an arbitrary combination of lists with high accuracy and probabilistic error bounds by using a K-minimum values algorithm (KMV). Denote with $h_i$ the maximum hash value contained in sampled list $\vec{t}_i$. By construction of the sampled list $\vec{t}_i$, $h_i \leq x$. Therefore, it can be safely assumed that $h_i = x$ for all $\vec{t}_i$. The HS component 204 can immediately deduce the rank r of hash value x in the sample union $\tilde{q}_U$, and hence directly estimate the distinct number of ids in $q_U$ (discussed in detail in paragraph 0044).

It can be seen that the HS component 204 needs to scan the sample $\tilde{q}_U$ in order to estimate $|q_U|_d$, hence the speed-up of this technique is directly proportional to the size of the sample used. For instance, a sample size of one percent will result in approximately a 100 times speed increase with respect to exact algorithms that examine a large portion of the inverted lists.

Furthermore, it can be appreciated that updating the samples is relatively straightforward. For insertions, the system 200 will hash a new inverted list entry inserted in the exact evaluation component 112 and if the hash value is smaller than or equal to x it will insert it into the sampled inverted list of the CS component 202 as well. Additionally, an entry deleted from an inverted list of the exact evaluation component 112 is deleted from the corresponding sampled inverted list of the CS component 202 as well, if it exists therein.

In addition, the selectivity estimation component 110 can include a post-stratification component 206, and an optimization component 208. The post-stratification component 206 improves sampling accuracy using post stratification, and is discussed in greater detail below (see FIG. 3). The optimization component 208 improves the performance of the selectivity estimation component 110 by decreasing the unnecessary processing of lists. Low IDF lists tend to contain a large number of sets, and do not contribute significantly to the overall score. Consequently, these lists can be excluded from processing in order to improve performance.

For simplicity of explanation, assume a query q with length len(q), consisting of n tokens with IDF's $idf(t_1) \geq idf(t_2) \geq \ldots, \geq idf(t_n)$ (e.g. tokens sorted in decreasing IDF order), and that every list is sorted by decreasing partial weight. Furthermore, assume tf is universally equal to 1 for all list entries. It can be appreciated that in order for a set contained in list $\vec{t}_i$ to exceed the threshold τ, provided that s does not appear in any list $\vec{t}_j$, j<i, it must have length:

$$len(s) \leq \lambda_i = \frac{\tau}{len(q)} \sum_{i}^{n} idf(t_i)$$ Equation (6)

wherein the optimization component 208 will not process the elements of the list $\vec{t}_i$ if the top element has length $len(s) > \lambda_i$.

Figure 3:
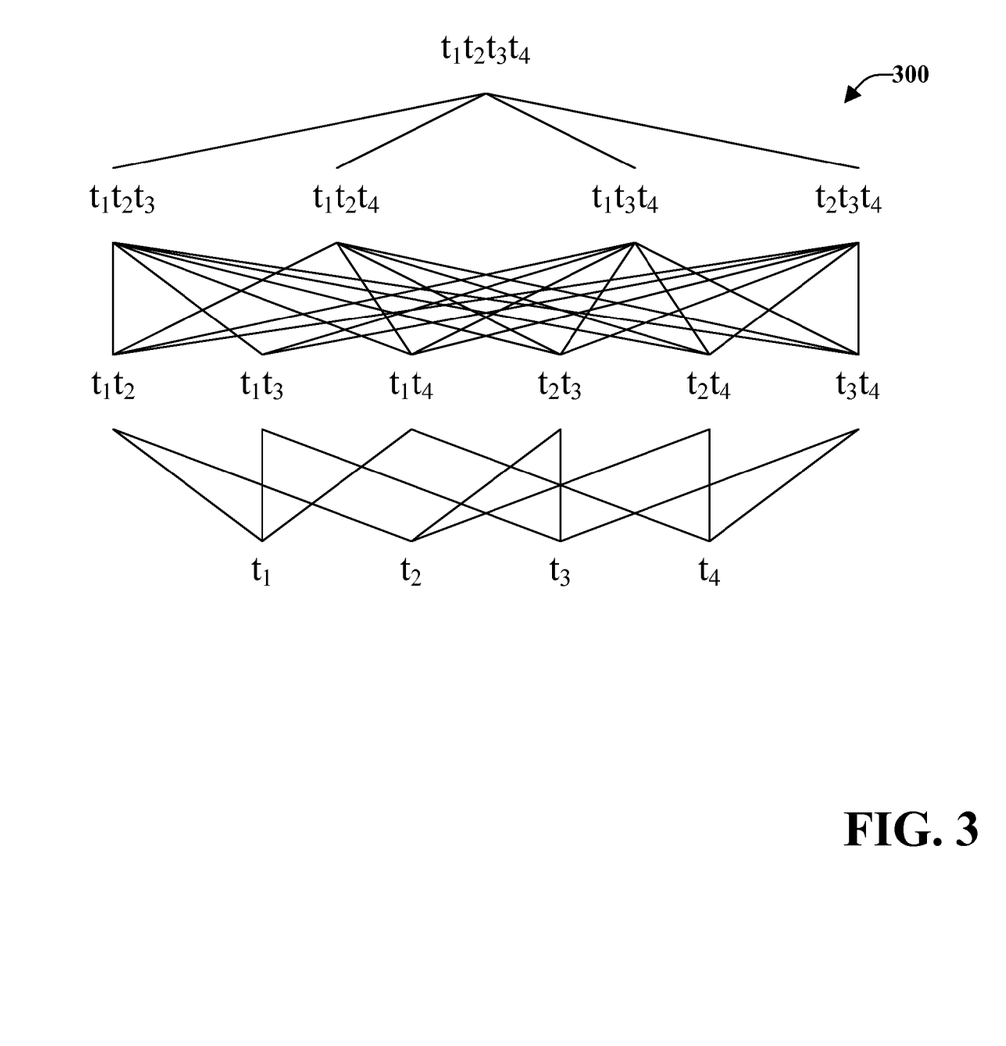
FIG. 3 is an illustration of an exemplary post-stratification lattice shown in accordance with an aspect of the present invention.

Referring now to FIG. 3, an exemplary post-stratification lattice 300 is shown in accordance with an aspect of the present invention. A selectivity estimator for set similarity selection queries (e.g., FIG. 1 and FIG. 2) can employ post-stratification to improve sampling accuracy. The lattice 300 is determined such that it has, conceptually, one node for every combination of lists in query q, for a total of $2^n$ nodes. Each node in the lattice is assigned the set ids in $\tilde{q}_U$ that, first, exceed the query threshold, and, second, have partial weights coming only from the lists corresponding to that node. Consequently, the nodes have mutually disjoint sets of ids, and the maximum size of the lattice is at most $|\tilde{q}_U|$ nodes.

A node specific scale up factor is determined for every node based only on the lists that correspond to that node. The final estimate is determined as the sum of the contributions from all the nodes. Post-stratification can improve the accuracy of selectivity estimation for set similarity selection queries, because as the number of instantiated lattice nodes increases, each node provides an independent estimate for a smaller subset of space. In practice, only a small number of lattice nodes will be instantiated, because in order for a given set to exceed the threshold τ it must appear in at least a certain number of lists. Therefore, nodes corresponding to combinations of a small number of lists will not contain any answers and will not be instantiated.

Figure 4:
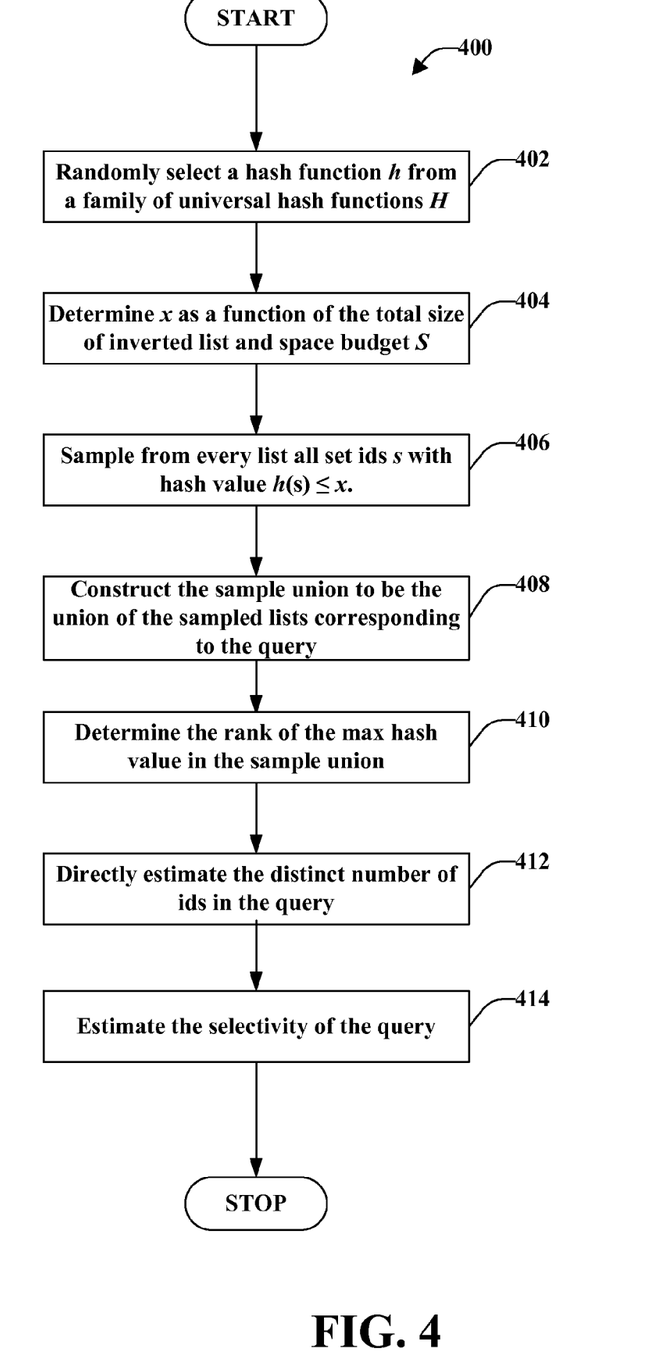
FIG. 4 is a general component block diagram illustrating a system for configuration and creation of industrial automation designs in accordance with an aspect of the present invention.

In view of the exemplary systems described supra, a methodology that may be implemented in accordance with the disclosed subject matter will be better appreciated with reference to the flow chart of FIG. 4. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, the illustrated blocks do not represent all possible steps, and not all illustrated blocks may be required to implement the methodologies described hereinafter.

FIG. 4 illustrates a methodology 400 for constructing a uniform random sample using hashed sampling. At 402, a hash function h is randomly selected from a family of universal hash functions H (e.g. h∈H). For simplicity of explanation assume, h distributes values in the interval [1,100]. At 404, a sample percentage x is chosen, in the interval [1, 100], based on the total size of the inverted lists, and a space budget S (discussed supra). At 406, sample from every list $\vec{t}_i$ in universe U all set ids s with a hash value $h(s) \leq x$. This will result in an x % sample of the list $\vec{t}_i$ and an x % overall sample of the inverted lists.

Continuing with the example supra, the novel mechanisms can additionally or alternatively be expressed using the following pseudo-code:

---

Sample Construction

Input : Lists $t_1,\ldots, t_{|U|}$, Hash Function
h ∈ H : ℕ → [1,100], Sample size x%
Output: Sampled lists $\vec{t}_1,\ldots, \vec{t}_{|U|}$
forall 1 ≦ i ≦ |U| do
    forall p = {s, w($t_i$, s)} ∈ $\vec{t}_i$ s.t. h(s) ≦ x do
        Insert p in $\vec{t}_i$
    end
end

---

At 408, given a query $q=\{t_1, \ldots, t_n\}$, construct the sample list union $\tilde{q}_U = \tilde{t}_1 \cup \ldots \cup \tilde{t}_n$, to be the union of the sampled lists corresponding to the query. At 410, the rank r of the maximum hash value x in the sample union $\tilde{q}_U$ is determined. Given that by construction of the sampled lists, the sample union $\tilde{q}_U$ contains all existing entries with hash values up to x in lists $\vec{t}_1, \ldots, \vec{t}_n$, the rank of x can be deduced easily. At 412, the distinct number of ids in $\vec{t}_1 \cup \ldots \cup \vec{t}_n$ can be directly estimated based on the rank r of the maximum hash value x (discussed infra).

At 414, the selectivity of the query $q=\{t_1, \ldots, t_n\}$ is estimated based at least in part on the constructed sample union $\tilde{q}_\cup$, as discussed supra (see Equation 5). Construction of the sampled lists ensures that for every sampled id $s \in \tilde{q}_\cup$ all partial weights $w(t_i, s)$ in lists $\tilde{t}_1, \ldots, \tilde{t}_n$ are present in $\tilde{q}_\cup$, and thus the scores $I(q, s)$ between the query q and all sampled sets s, can be determined from the sample directly.

Continuing with the example supra, one or more of the novel mechanisms can additionally or alternatively be expressed using the following pseudo-code:

---

Selectivity Estimation

Input:   Query $q = \{t_1, \ldots, t_n\}$, Samples $\tilde{t}_s, \ldots, \tilde{t}_n$
         Threshold $\tau$
Output:  Estimated number of sets with $I(q, s) \geq t$
Let $A_s = 0, x = 0$
forall $s \in \tilde{q}_u$ do
    If $I(q, s) \geq \tau, A_s + = 1$
    $x = \max(x, h(s))$
end
$D = |P|(|\tilde{q}_u|_d - 1) / x$ Return $A_s \cdot \dfrac{D}{|\tilde{q}_u|_d}$

---

The hashed sampling methodology described above can estimate the distinct number of ids in the union of arbitrary unions of inverted lists with high accuracy and probabilistic error bounds, by using the K-Minimum Value Algorithm (KMV), wherein given the hash function $h:D \to P$, multi-set S and letting $h_r$ be the r-th smallest hash value in the S, the quantity $D_r = |P|(r-1)/h_r$ is an unbiased estimate of the distinct number of values in S. Specifically, given $0 < \delta < 1$, there exist $\epsilon$ dependent on r, such that $(1-\epsilon)|S|_d \leq D_r \leq (1+\epsilon)|S|_d$.

Given that the resulting sample union of the random samples for an arbitrary query is always an x % sample of the union of the inverted lists $\vec{t}_1, \ldots, \vec{t}_n$ corresponding to the query, probabilistic error guarantees and space bounds can be determined using the VC-dimension of the problem (discussed infra). The total error of the selectivity estimation can be determined based at least in part on the additive error from estimating the numerator of the scaling factor in Equation 5. Assume $\epsilon, \epsilon', \delta > 0$. Any random sample of size $$O\left(\dfrac{\frac{1}{\epsilon^2}\ln 1}{\epsilon^2 \delta}\right),$$

with probability of failure at most $\delta$, in the worst case will provide answers within $(E-\epsilon|q_\cup|_d)(1-\epsilon') \leq \tilde{A} \leq (E+\epsilon|q_\cup|_d)(1+\epsilon')$, where E is the exact answer size, and A the final selectivity estimate from HS. The foregoing suggests that $(E-\epsilon|q_\cup|_e) \leq A \leq (E+\epsilon|q_\cup|_d)$, where E is the exact answer and A is the sample estimate. We are further estimating A within $(1-\epsilon') A \leq \tilde{A} \leq (1+\epsilon')A$, where $\epsilon'$ is the approximation error introduced by the KMV estimation. Combining the errors yields the equation:

$$(E-\epsilon|q_\cup|_d)(1-\epsilon') \leq \tilde{A} \leq (E+\epsilon|q_\cup|_d)(1+\epsilon') \quad \text{Equation (6)}$$

It can be observed that the estimation accuracy depends on two errors: that of estimating the frequency of query answers from the sample, and that of the K-Minimum distinct values estimation for scaling the results. Given any sample size $|S|$, from Theorem 1 and Theorem 2 we can deduce that $\epsilon' \ll \epsilon$. Therefore, as the size of the sample increases the error introduced by the distinct value estimation becomes exceedingly smaller than the error of frequency estimation.

Figure 5:
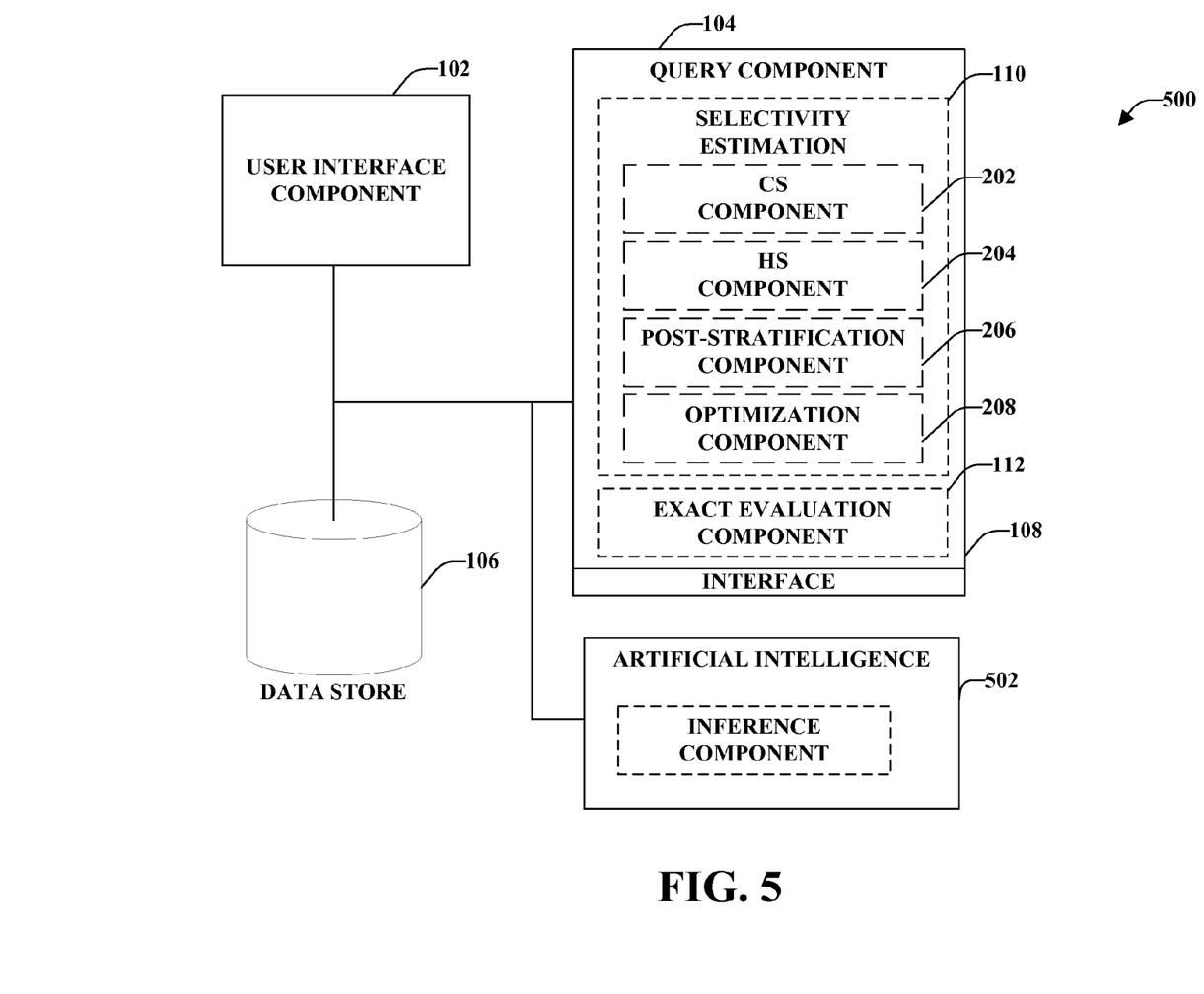
FIG. 5 illustrates a system that employs an artificial intelligence component which facilitates automating one or more features in accordance with the subject invention.

FIG. 5 illustrates an approach 500 that employs an artificial intelligence (AI) component 502 which facilitates automating one or more features in accordance with the subject invention. The subject invention (e.g., in connection with inferring) can employ various AI-based schemes for carrying out various aspects thereof. For example, a process for selectivity estimation could be facilitated by artificial intelligence.

A classifier is a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that a user desires to be automatically performed. For instance, depending on the implementation a confidence can be assigned to the set of criteria, and an inference can be made as to the criteria that should be used as triggers for adding dithering.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., primary versus secondary, static versus dynamic, . . . ), and at what time of day to implement tighter criteria controls (e.g., in the evening when system performance would be less impacted).

Figure 6:
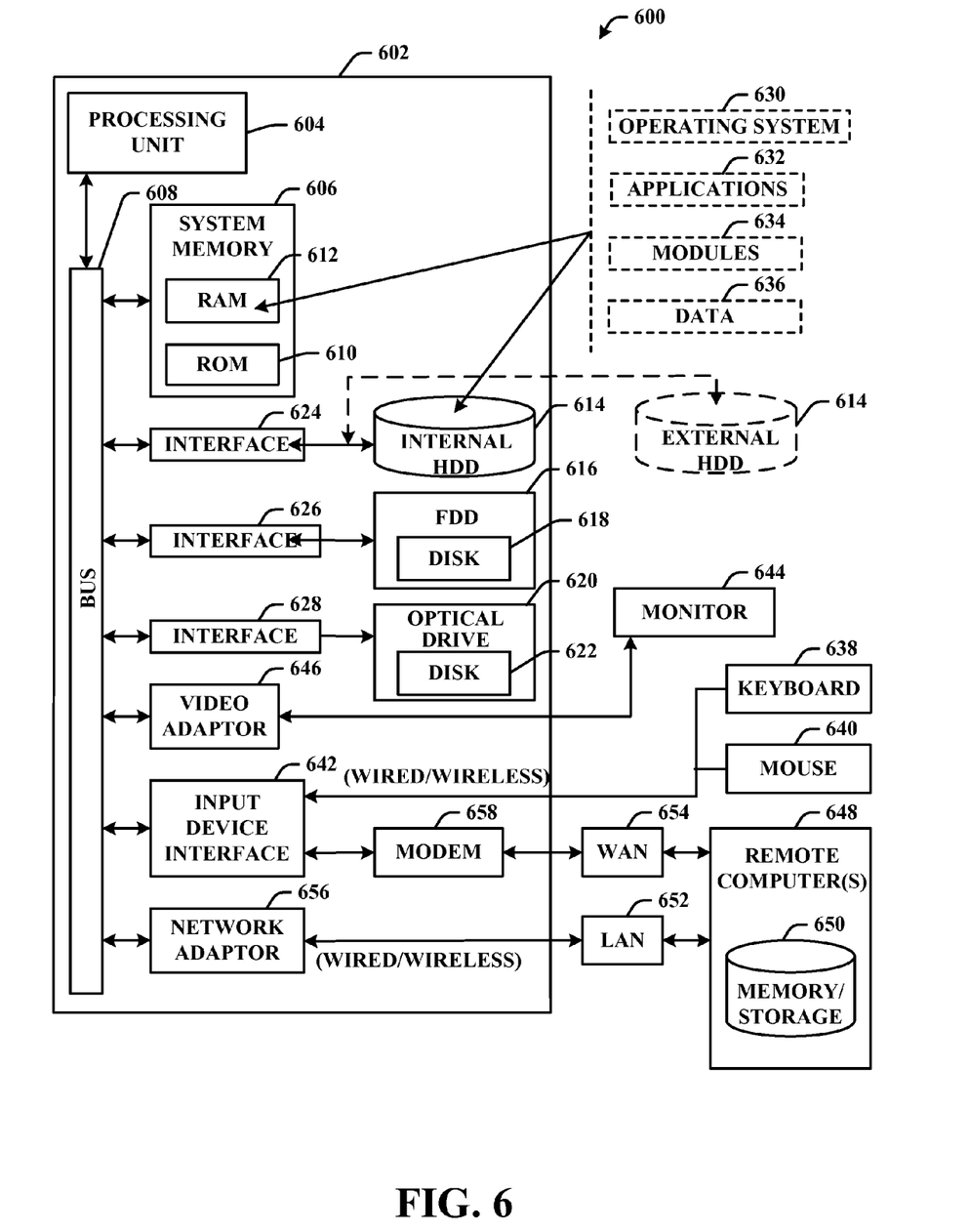
FIG. 6 illustrates an example computing environment that can be employed in connection with various aspects described herein.

Referring now to FIG. 6, there is illustrated a block diagram of a computer operable to execute the disclosed architecture. In order to provide additional context for various aspects of the subject invention, FIG. 6 and the following discussion are intended to provide a brief, general description of a suitable computing environment 600 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, there is illustrated an exemplary environment 600 for implementing various aspects of the invention that includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 612, including an operating system 630, one or more application programs 632, other program modules 634 and program data 636. All or portions of the operating system, applications, modules, and/or data can also be cached in the RAM 612. It is appreciated that the invention can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices, and companies, and facilitate enterprise-wide computer networks, such as intranets, all of which may connect to a global communication network, e.g., the Internet.

When used in a LAN networking environment, the computer 602 is connected to the local network 652 through a wired and/or wireless communication network interface or adapter 656. The adaptor 656 may facilitate wired or wireless communication to the LAN 652, which may also include a wireless access point disposed thereon for communicating with the wireless adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 7:
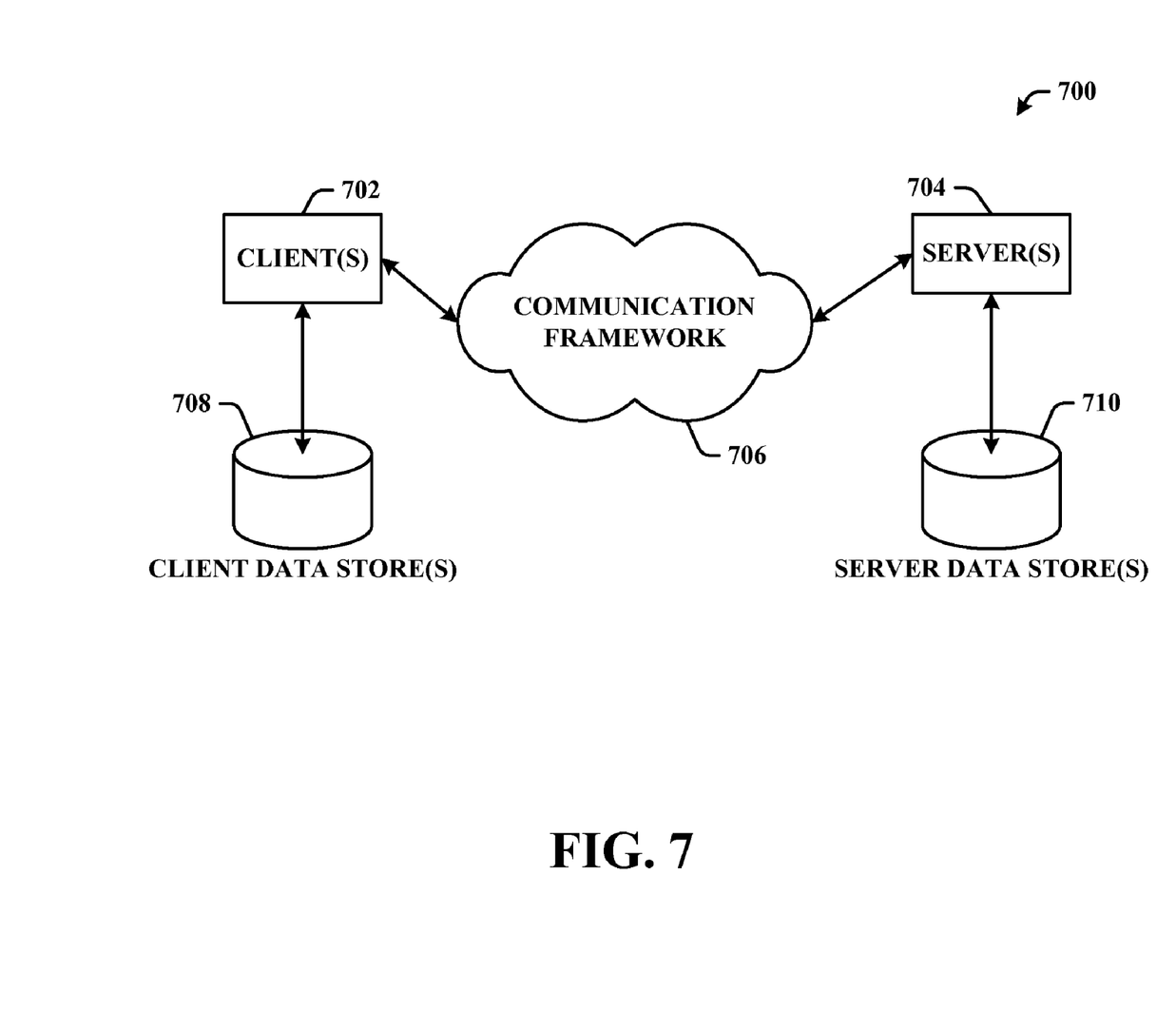
FIG. 7 is a schematic block diagram of a sample-computing environment with which the subject invention can interact.

Referring now to FIG. 7, there is illustrated a schematic block diagram of an exemplary computing environment 700 in accordance with the subject invention. The system 700 includes one or more client(s) 702. The client(s) 702 can be hardware and/or software (e.g., threads, processes, computing devices). The client(s) 702 can house cookie(s) and/or associated contextual information by employing the invention, for example.

The system 700 also includes one or more server(s) 704. The server(s) 704 can also be hardware and/or software (e.g., threads, processes, computing devices). The servers 704 can house threads to perform transformations by employing the invention, for example. One possible communication between a client 702 and a server 704 can be in the form of a data packet adapted to be transmitted between two or more computer processes. The data packet may include a cookie and/or associated contextual information, for example. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A selectivity estimation system, comprising:
   a memory that stores computer-executable components including:
      a user interface component configured to obtain a search query; and
   a query component configured to estimate a number of data incidents in a data store that resemble the search query based on a pre-specified similarity function and a criterion defined by the search query, wherein the query component comprises:
      an evaluation component configured to
         generate an inverted index comprising a plurality of inverted lists by decomposition of data incidents in the data store that resemble the search query into a set, comprising at least one token, and
         generate a list comprising a partial weight for respective tokens of the at least one token and a set identification for respective data incidents in the data store that resemble the search query; and
      a sample construction component configured to
         select a hash function that imposes a random permutation of elements in a domain of set identifications from a plurality of universal hash functions, and
         sample, from an inverted list of the plurality of inverted lists, a subset of the set identifications with respective hash values less than a threshold; and
   a processor that facilitates execution of at least one of the computer-executable components.

2. The system of claim 1, wherein the at least one token is generated by decomposition of the data incidents in the data store into a least one of at least one word, or at least one q-gram, wherein q is an integer.

3. The system of claim 1, wherein the threshold is determined based on a space budget.

4. The system of claim 1, further comprising a hashed sample component configured to estimate a number of data instances to retrieved in response to the search query by determination of a similarity score for respective sampled sets with the search query, a size of a sample union of respective sampled lists corresponding to the search query, and a number of set identifications in a union of the plurality of inverted lists; wherein the respective sampled lists contain existing entries with hash values up to a maximum hash value.

5. The system of claim 1, wherein the query component is configured to translate the search query into a format suitable for search of the data store.

6. The system of claim 1, wherein an estimated result of the search query is returned via the user interface component.

7. The system of claim 1, wherein at least one related result is a variation of the search query based on the pre-specified similarity function.

8. The system of claim 7, wherein the variation includes an alternate spelling.

9. The system of claim 7, wherein the variation includes a synonym.

10. The system of claim 1, further comprising a post-stratification component configured to assist sampling accuracy via post stratification.

11. The system of claim 1, further comprising an optimization component configured to supplement performance of the selectivity estimation system by reduction of processes applied to lists that are not necessary.

12. The system of claim 11, wherein the optimization component is further configured to exclude low inverse document frequency lists from the processes.

13. The system of claim 1, wherein the at least one token is generated by decomposition of the data incidents into at least one word.

14. The system of claim 1, wherein the threshold is determined based at least in part on an external input.

15. A method for selectivity estimation, comprising:
estimating a number of data incidents in a data store that resemble a search query based at least in part on a pre-specified similarity function and a criterion defined by the search query;
generating an inverted index comprising at least one inverted list by decomposing respective data incidents in the data store into a set, comprising at least one token and generating a list comprising a partial weight contribution and a set identification for respective data incidents in the data store corresponding to respective tokens of the at least one token; and
selecting a hash function from a plurality of universal hash functions that impose a random permutation of elements in a domain of set identifications and sampling from respective inverted lists of the at least one inverted list a subset of the set identifications with a hash value less than a threshold.

16. The method of claim 15, further comprising generating the at least one token by decomposing the data incidents in the data store into at least one word.

17. The method of claim 15, further comprising determining the threshold based on a space budget.

18. The method of claim 15, wherein estimating the number of data instances to be retrieved for the search query further comprises determining a similarity score for respective sampled sets with the search query, a size of a sample union of sampled lists corresponding to the search query, and a number of set identifications in a union of the at least one inverted list; wherein the respective sampled lists comprise existing entries with hash values up to a maximum hash value.

19. The method of claim 15, further comprising translating the search query into a format suitable for searching the data store.

20. The method of claim 15, further comprising returning a result of the search query.

21. The method of claim 15, wherein a related result is a variation of the search query based on the pre-specified similarity function.

22. The method of claim 21, wherein the variation includes a typographical error.

23. The method of claim 21, wherein the variation includes an alternate spelling.

24. The method of claim 15, further comprising assisting sampling accuracy via post stratification.

25. The method of claim 15, further comprising excluding low inverse document frequency lists from processing.

26. The method of claim 15, further comprising generating the at least one token by decomposing the data incidents into at least one q-gram, wherein q is an integer.

27. A computer-readable storage medium having stored thereon computer-executable components that, in response to execution, cause a computing system to perform operations comprising:
acquiring a search query;
estimating a number of data incidents in a data store that resemble the search query based on a pre-specified similarity function and a criterion defined by the search query;
generating an inverted index, comprising at least one inverted list, by decomposing respective data incidents in the data store into at least one set comprising at least one token and generating at least one list for respective tokens of the at least one token comprising a partial weight contribution and a set identification for respective data incidents in the data store; and
selecting a hash function that imposes a random permutation of elements in a domain of set identifications from a plurality of universal hash functions and sampling from respective inverted lists of the one or more inverted lists a subset of the set identifications with a hash value less than a threshold.

28. The computer-readable storage medium of claim 27, wherein the operations further comprise generating the at least one token by decomposing the data incidents into at least one word.

29. The computer-readable storage medium of claim 27, wherein the operations further comprise determining the threshold based at on a space budget.

30. The computer-readable storage medium of claim 27, wherein the estimating the number of data instances to be retrieved for the search query further comprises determining a similarity score for respective sampled sets with the search query, a size of a sample union of sampled lists corresponding to the search query, and a number of set identifications in a union of the at least one inverted list, corresponding to the respective tokens, wherein the sampled lists contain existing entries with hash values up to a maximum hash value.

31. The computer-readable storage medium of claim 27, wherein the operations further comprise determining the threshold based at least in part on a manual input.

* * * * *